No. 745,625. PATENTED DEC. 1, 1903.
T. W. JERREMS.
MACHINE FOR MAKING GRASS TWINE.
APPLICATION FILED JAN. 15, 1903.
NO MODEL. 4 SHEETS—SHEET 1.
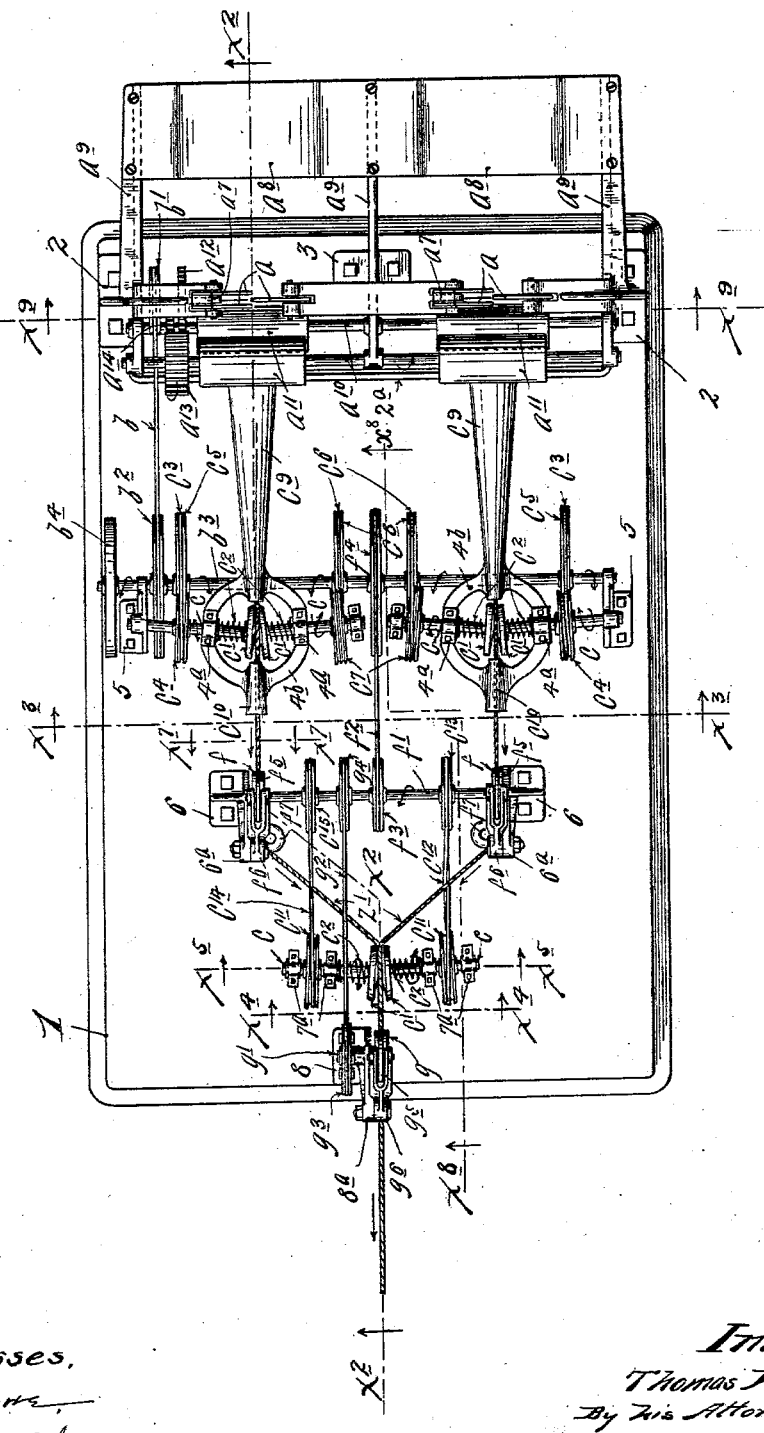

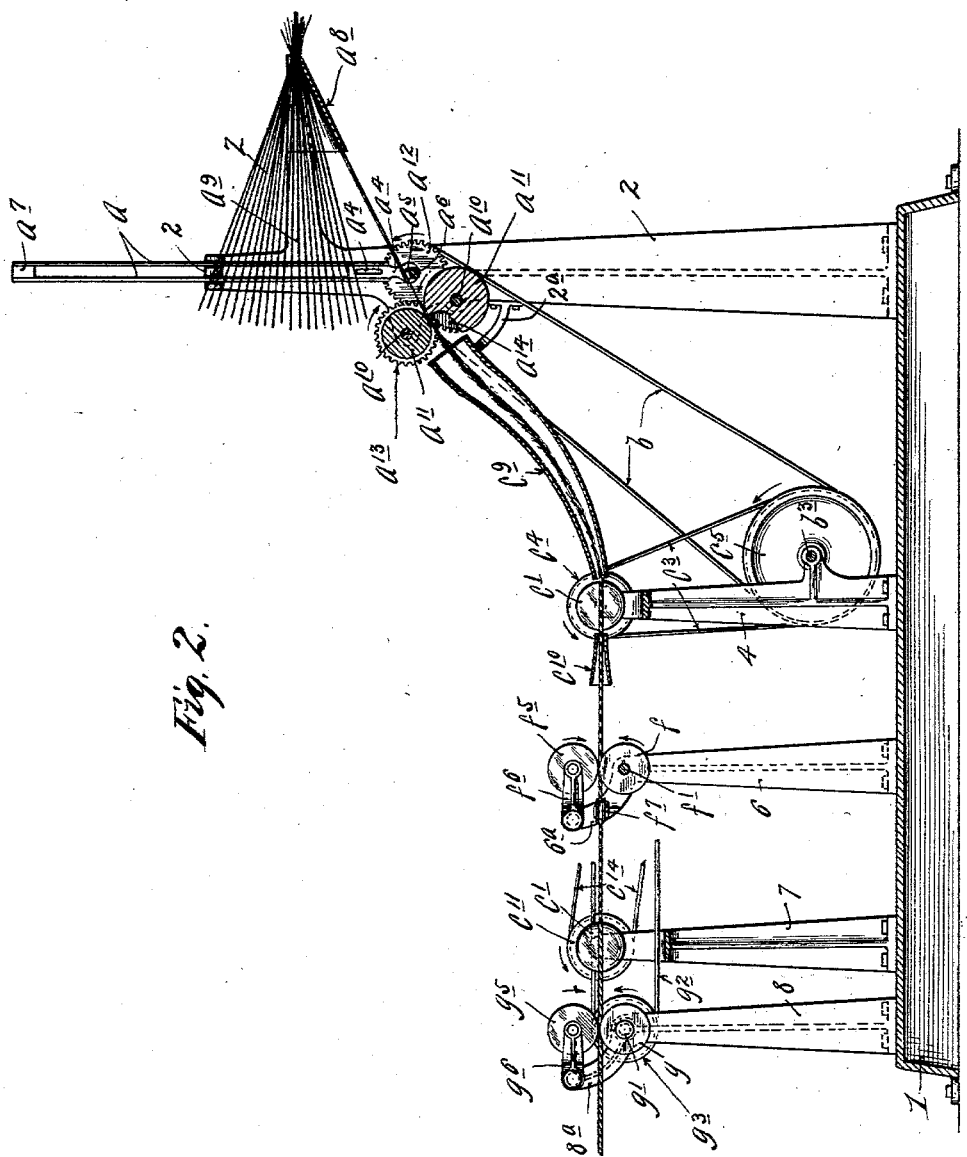

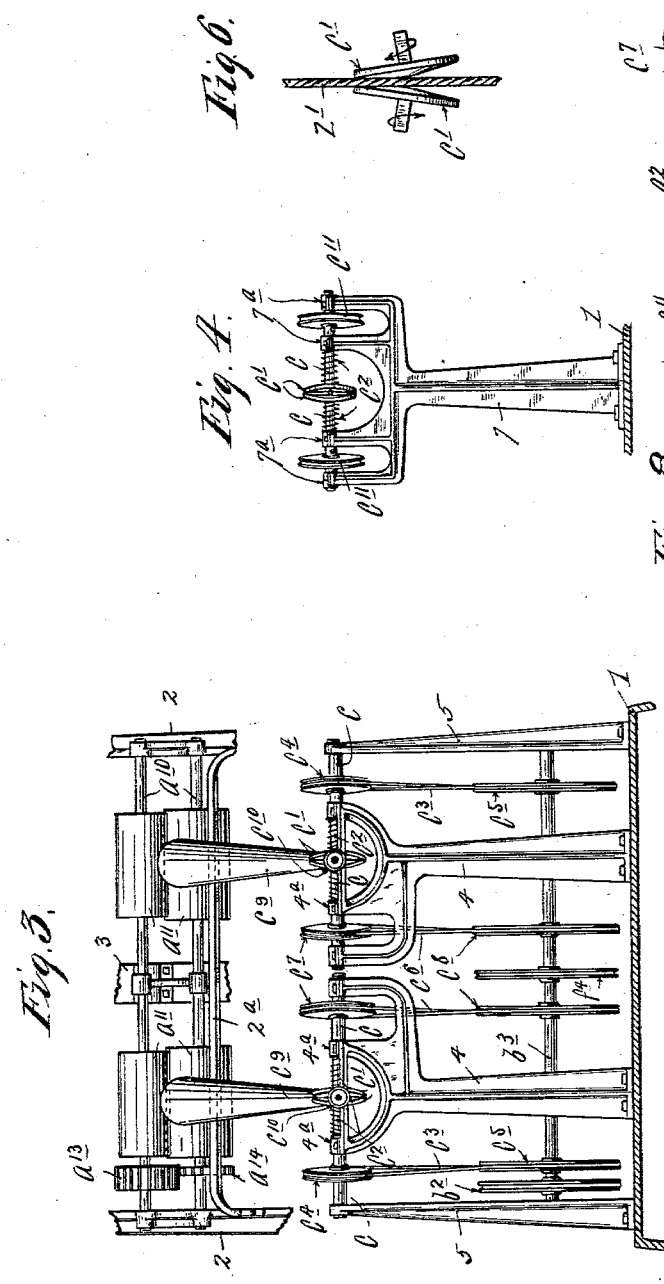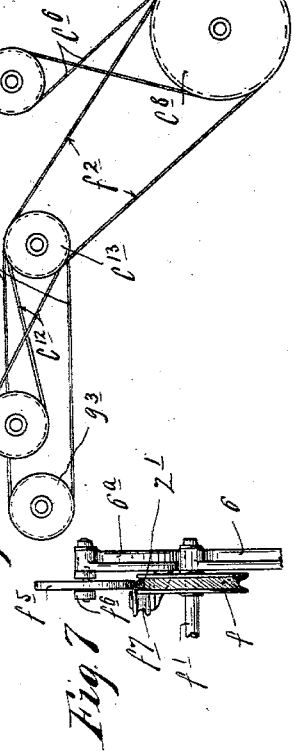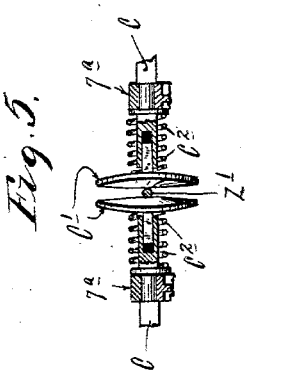

No. 745,625. PATENTED DEC. 1, 1903.
T. W. JERREMS.
MACHINE FOR MAKING GRASS TWINE.
APPLICATION FILED JAN. 15, 1903.
NO MODEL. 4 SHEETS—SHEET 4.
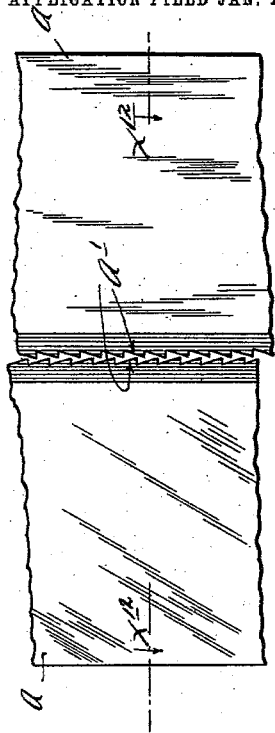
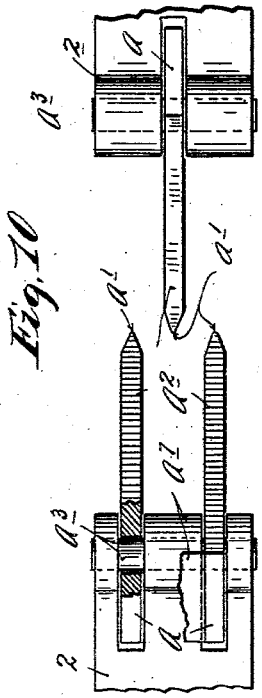
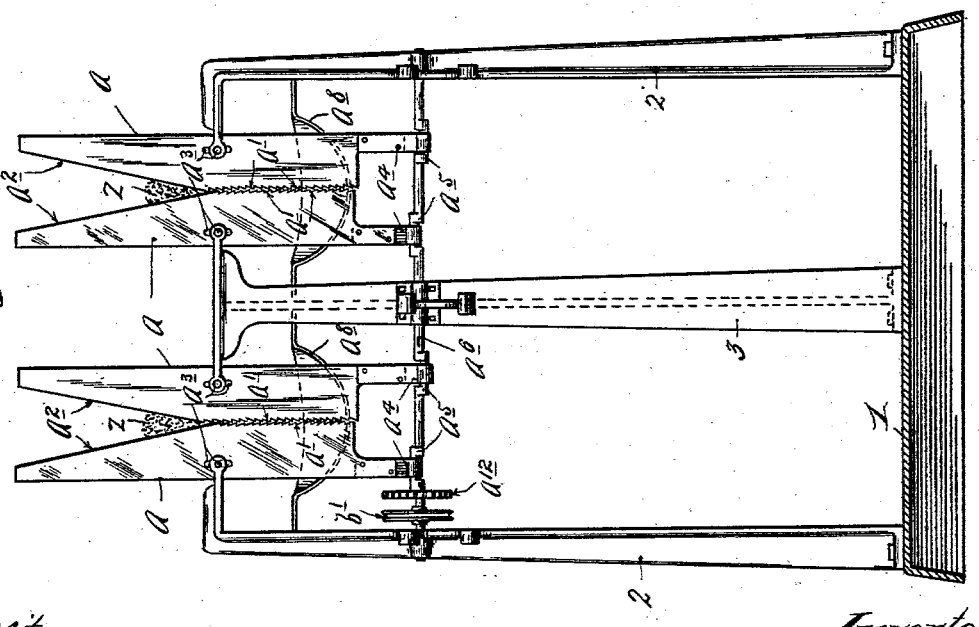
Witnesses.
N. D. Kilgore
A. H. Opsahl
Inventor.
Thomas W. Jerrems
By his Attorneys,
Williamson & Merchant No. 745,625. Patented December 1, 1903.

UNITED STATES PATENT OFFICE.

THOMAS W. JERREMS, OF ST. PAUL, MINNESOTA, ASSIGNOR OF ONE-HALF TO EDWARD W. GOODRICK, OF ST. PAUL, MINNESOTA.

MACHINE FOR MAKING GRASS TWINE.

SPECIFICATION forming part of Letters Patent No. 745,625, dated December 1, 1903.

Application filed January 15, 1903. Serial No. 139,242. (No model.)

*To all whom it may concern:*

Be it known that I, THOMAS W. JERREMS, a citizen of the United States, residing at St. Paul, in the county of Ramsey and State of Minnesota, have invented certain new and useful Improvements in Machines for Making Grass Twine; and I do hereby declare the following to be a full, clear, and exact description of the invention, such as will enable others skilled in the art to which it appertains to make and use the same.

My invention has for its object to provide an improved machine especially adapted for making what is known as "grass" twine; and to this end it consists of the novel devices and combinations of devices hereinafter described, and defined in the claims. As is well known, this grass twine or cord is made from long wiry swamp-grass, which is usually twisted together by means of machines provided for that purpose. This grass twine or cord is used for a great many different purposes in the commercial field. Hitherto such grass twine has usually been made with a single twist, and to prevent unwinding of the same it has been wound about with an ordinary binding twine or thread.

The principal feature of my invention resides in the grass-feeding device for feeding, in an even order of succession, the long wiry grass-stems to the twisting devices or to other devices which are to receive them. This grass-feeding device involves coöperating blades or bars having serrated edges—that is, teeth or similar projections which coöperate to feed the grass-stems one or more at a time—one or more of the said feed-bars or blades having a vibrating movement to produce the feeding action.

Another feature of the invention is found in an improved form of twister for twisting together the stems. This twister involves a pair of reversely-driven beveled disks set with their axes at an angle to each other.

The invention is illustrated in the accompanying drawings, wherein like characters indicate like parts throughout the several views.

Figure 1 is a plan view of the complete machine. Fig. 2 is a longitudinal vertical section taken on the irregular line $x^2 x^2$ of Fig. 1. Fig. 3 is a transverse vertical section taken on the line $x^3 x^3$ of Fig. 1. Fig. 4 is a detail in vertical section on the line $x^4 x^4$ of Fig. 1. Fig. 5 is a detail in section on the line $x^5 x^5$ of Fig. 1, showing one of the twisters. Fig. 6 is a detail in plan illustrating the action of a pair of twisting-disks on the twine. Fig. 7 is a detail in section on the line $x^7 x^7$ of Fig. 1. Fig. 8 is a diagram of certain of the driving-belts and pulleys, showing the same substantially as they would appear if the line of their action was taken on $x^8 x^8$ of Fig. 1. Fig. 9 is a transverse vertical section taken on the line $x^9 x^9$ of Fig. 1 and showing the grass-feeding devices. Fig. 10 is a detail in plan and with some parts broken away, illustrating the relative positions of the three serrated feed blades or bars of one of the grass-feeding devices. Fig. 11 is a detail in front elevation showing the intermediate portions of the feeding blades or bars illustrated in Fig. 10 and also in certain of the other views; and Fig. 12 is a horizontal section on the line $x^{12} x^{12}$ of Fig. 11.

The numeral 1 indicates a horizontal base or bed plate provided with a plurality of vertical standards 2, 3, 4, 5, 6, 7, and 8. By means of the standards 2 and 3 two independent feed devices are supported at what may be termed the "front" of the machine. Each of these feed devices in the construction illustrated involves as follows: The character $a$ indicates three vertically-disposed feed blades or bars having serrated inner edges $a'$ and beveled inner edges $a^2$ above the said serrations. At one side two of the feed-blades $a$ are located parallel to each other, but spaced apart laterally, while the one coöperating blade on the other side is so located that it works in a plane passing between the coöperating blades on the other side, as best shown in Figs. 10 and 12. The coöperating beveled surfaces $a^2$ form an upwardly-diverging crotch, which leads downward to the serrated edges of the feed-blades and is adapted to receive the butt-ends of the bunch of long grass-blades, as best shown in Figs. 2 and 9, wherein the character $z$ indicates such grass-blades. The said feed-blades $a$ are guided for true vertical movement by slot-and-pin engagements $a^3$, formed between the same and laterally-projecting portions of the upper ends of the brackets 2 and 3, as best shown in Figs. 9 and 10. At their lower ends the said blades $a$ are provided with depending portions $a^4$, which are pivoted on the crank portions $a^5$ of a crank-shaft $a^6$, journaled in suitable bearings on the standards 2 and 3, as best shown in Figs. 2 and 9. The cranks $a^5$ have a very slight throw, usually not more than one-sixteenth of an inch. The depending portions $a^4$, which connect together the pairs of laterally-spaced blades $a$, serve as spacing-blocks to separate the lower ends thereof, while the upper portions of said blades are spaced apart by spacing-blocks $a^7$, as best shown in Fig. 2.

The top ends of the two bunches of grass $z$ are independently supported by hopper-like plates $a^8$, shown as supported by projecting arms $a^9$ of the brackets 2 and 3. (See Figs. 1 and 2.)

Suitably journaled in the standards 2 and 3 in the vicinity of the crank-shaft $a^6$, but rearward thereof, is a pair of parallel shafts $a^{10}$, which are provided with coöperating feed-rollers $a^{11}$, located in position to receive between them and to feed forward the blades of the grass delived thereto by the coöperating feed-blades $a$, as will hereinafter more fully appear. To impart proper rotary movements to the shafts $a^{10}$ and their rollers $a^{11}$, as indicated by arrows marked on Fig. 2, the crank-shaft $a^6$ is provided with a spur-gear $a^{12}$, which meshes with a wide-faced spur-gear $a^{13}$ on one end of the upper shaft $a^{10}$, and the corresponding end of the lower shaft $a^{10}$ is provided with a spur-gear $a^{14}$, which also meshes with the said wide-faced gear $a^{13}$, as best shown in Figs. 1 and 2.

The crank-shaft $a^6$ receives motion through a belt $b$, which runs over a pulley $b'$ thereon and over a relatively large pulley $b^2$, carried by a shaft $b^3$, suitably journaled in the lower portions of the two laterally-spaced standards 4, as best shown in Figs. 1 and 2.

All of the running parts of the machine receive motion from the shaft $b^3$, and the said shaft receives motion from a power-driven belt, (not shown,) but which would run over a pulley $b^4$ on the said shaft $b^3$.

In line with each grass-feeding device and each coöperating pair of rollers $a^{11}$ is a so-called "primary" twister constructed as follows: In suitable bearings $4^a$ on the upper ends of the standards 4 are coöperating shaft-sections $c$, which extend transversely of the machine, but at a slight angle to each other, as best shown in Fig. 1. Secured to the abutting ends of the coöperating shaft-sections $c$ are beveled disks $c'$, which are yieldingly pressed together or onto the twisted strands $z'$ of the twine, as shown, by coiled springs $c^2$, placed between the said disks and the adjacent bearings $4^a$. The said shaft-sections $c$ are of course free for a slight endwise movement. The two outer shaft-sections $c$ are driven by belts $c^3$, which run over pulleys $c^4$ on said shaft-sections and over pulleys $c^5$ on the driving-shaft $b^3$. The left-hand belt $c^3$ (directions being taken with respect to the observer standing and facing the receiving end of the machine) is a cross-belt, while the right-hand belt $c^3$ is not a crossed belt. The inner shaft-sections $c$ are rotated in reverse direction from the coöperating outer shaft-sections through belts $c^6$, which run over pulleys $c^7$ on said inner shaft-sections and over pulleys $c^8$ on the said driving-shaft $b^3$. The right-hand belt $c^6$ is a crossed belt, while the left-hand belt $c^6$ is not a crossed belt. The disks of the primary twisters will thus through the belts $c^3$ and $c^6$ be so driven that they will twist two strands of the cord in the same direction.

The partially-twisted strands of the twine are guided from the feed-rollers $a^{11}$ to the respective twisters—to wit, the coöperating twisting-disks $c'$—by guide-spouts $c^9$, shown as supported at their receiving ends from the standards 2 by brackets $2^a$ and at their delivery ends by yoke-like portions $4^b$ of the standard 4, which yokes are further provided with short guide-tubes $c^{10}$, that extend therefrom in the opposite direction from the tubes $c^9$ and on the delivery sides of the primary twisters, as best shown in Figs. 1 and 2.

From the guide-spouts $c^{10}$ the twisted strands of the twine are, as shown, passed over so-called "drawing-sheaves" $f$, carried by a transverse counter-shaft $f'$, journaled in the standards 6 and receiving motion through a belt $f^2$, which runs over pulleys $f^3$ and $f^4$, respectively, on the shafts $f'$ and $b^3$. Coöperating with each drawing-sheave $f$ is an idle presser-wheel $f^5$, mounted in the free end of a gravity-held arm $f^6$, pivoted to an extension $6^a$ of the corresponding standard 6, as best shown in Figs. 2 and 7. These presser-wheels $f^5$ keep the twisted strands of the twine pressed against the grooved peripheries of the drawing-sheaves $f$, so as to give the latter sufficient frictional engagement with the said strands, and to further insure the proper drawing action thereof on the strands the grooves of the said sheaves are advisably roughened, as shown in Fig. 7.

After the strands of the twine pass the drawing-sheaves $f$ they are drawn and twisted together to form a single cord by means of a so-called "secondary" twister, which is shown as substantially identical in construction with the primary twisters, and hence is indicated by like characters. To guide the twisted strands of the cord from the drawing-sheaves to the secondary twister, they are passed over idle guide-sheaves $f^7$, shown as mounted on the projection $6^a$ of the standards 6, as best shown in Figs. 1 and 2. The said secondary twister is located to the rear of the drawing-sheaves $f$, and preferably on a line passing midway between the same, as clearly shown in Fig. 1. If found necessary, a guide of suitable construction may be placed just in front of the coöperating beveled twisting-disks $c'$ of this secondary twister. The shafts $c$ of this secondary twister are journaled in suitable bearings 7ª of the standards 7 and are provided with grooved pulleys $c^{11}$. A crossed belt $c^{12}$ runs over the left-hand sheave $c^{11}$ and over the pulley $c^{13}$ on the shaft $f'$. An ordinary belt $c^{14}$ runs over the right-hand pulley $c^{11}$ and over a pulley $c^{15}$ also on the said shaft $f'$. In this way, as is evident, reverse rotary movements are imparted to the coöperating disks $c'$ of the secondary twister.

The completed cord as it is drawn from the secondary twister is preferably passed over a secondary pulling-sheave $g$, the short shaft $g'$ of which is mounted in the upper end of the standard 8 and receives motion in the proper direction to pull rearward on the twine through a belt $g^2$, that runs over pulleys $g^3$ and $g^4$, respectively, on the shafts $g'$ and $f'$. This secondary pulling device, like the primary pulling devices, involves also an idle presser-wheel $g^5$, which is carried by an arm $g^6$, pivoted to an extension 8ª of the standard 8.

Operation: In starting a machine into action leaders or sections of twine already formed are first passed through the spouts $c^9$ between the beveled disks $c'$ of the primary twisters, between the coöperating sheaves $f$ and the presser-wheels $f^5$, over the guide-sheaves $f^7$, then both of the same between the twisting-disks of the secondary twister and between the sheave $g$ and coöperating presser-wheel $g^5$ of the secondary drawing-sheave. Then when the machine is set into action the strands of the cord which is being formed will follow the paths of the leaders just above followed out. Under the rapid but very short reciprocating motions of the coöperating feed blades or bars $a$ their serrated edges $a'$ will work downward the butt-ends of the grass blades or stems in an even order of succession—to wit, one or more for each reciprocation, but always approximately the same number for each reciprocation—and will drop the same where their ends will stand in position to pass between the coöperating feed-rollers $a^{11}$. By the feed-rollers said grass-stems will be fed endwise into the corresponding receiving ends of the guide-spouts $c^9$, and as they are drawn through these feed-spouts they will be loosely twisted together under the actions of the primary twisters—to wit, the primary twisting-disks $c'$. As the partially-twisted strands are drawn between the primary twisting-disks, the coöperating members of which it will be remembered rotate in reverse directions, the said strands will be tightly twisted and will be reduced to their minimum size. All this time the twisted strands are of course constantly drawn rearward by the so-called "primary" drawing devices, consisting of the coöperating sheaves $f$ and presser-wheels $f^5$.

It will further be remembered that the left-hand disks of the primary twisters are driven in the same direction and that the two right-hand disks of the said twisters are driven in a reverse direction, but in the same direction with respect to each other, so that the two strands of the cord are twisted in the same direction. Hence when the two twisted strands are brought together they tend to twist into a common cord, which twisting movement is assisted by the so-called "secondary" twister. It is a well-known fact that two cords twisted in the same direction, then placed together and released, will twist together and form a single cord. After the two twisted strands pass from the primary drawing devices they are passed between the beveled disks of the secondary twister, and are thereby twisted into a single cord. The secondary twisting-disks serve to true or even up the cord twisted from the two strands and to give the same a comparatively smooth outer surface. After the finished cord passes from between the disks of the secondary twister it passes between the coöperating sheaves $g$ and presser-wheel $g^{15}$ of the secondary drawing device and is kept drawn taut up to that point. From thence the cord is wound onto a suitable reel (not shown) or is delivered to any other suitable device which may be provided for receiving the same.

It will of course be understood that the machine above described is capable of a large range of modification within the scope of my invention as herein set forth and claimed.

What I claim, and desire to secure by Letters Patent of the United States, is as follows:

1. A feeding device for a machine of the character described, comprising opposing blades or bars having coöperating serrated edges, and means for vibrating one or more of said blades or bars to produce the feeding action, substantially as described.

2. A feeding device for a machine of the character described, comprising opposing blades or bars having coöperating serrated edges, and having diverging upper extensions which afford crotches leading to the said serrated edges, and means for reciprocating one or more of said blades or bars to produce the feeding action, substantially as described.

3. In a feeding device for a machine of the character described, the combination with opposing blades or bars having coöperating serrated edges and diverging upper portions which afford crotches leading to said serrated edges, supports or rests coöperating with the diverging portions of said blades or bars, to support the twine-forming material, and means for reciprocating one or more of said blades or bars, substantially as described.

4. A feeding device for a machine of the character described comprising opposing feed blades or bars having coöperating serrated edges and diverging upper portions, the latter affording crotches leading to said serrated edges, and means for reversely reciprocating the opposing feed blades or bars, substantially as described.

5. A feeding device for a machine of the character described comprising opposing feed blades or bars located in different vertical planes, one of said opposing bars being set to work between the planes of two opposing bars, substantially as described.

6. A twister for a machine of the character described comprising a pair of reversely-driven beveled disks set with their axes at an angle to each other and transversely intersecting the line of travel of the material being twisted thereby.

7. A twister for a machine of the character described comprising a pair of reversely-driven spring-pressed beveled disks set with their axes at an angle to each other and transversely intersecting the line of travel of the material being twisted, substantially as described.

In testimony whereof I affix my signature in presence of two witnesses.

THOMAS W. JERREMS.

Witnesses:
ELIZABETH H. KELIHER,
F. D. MERCHANT.